Patented May 29, 1923.

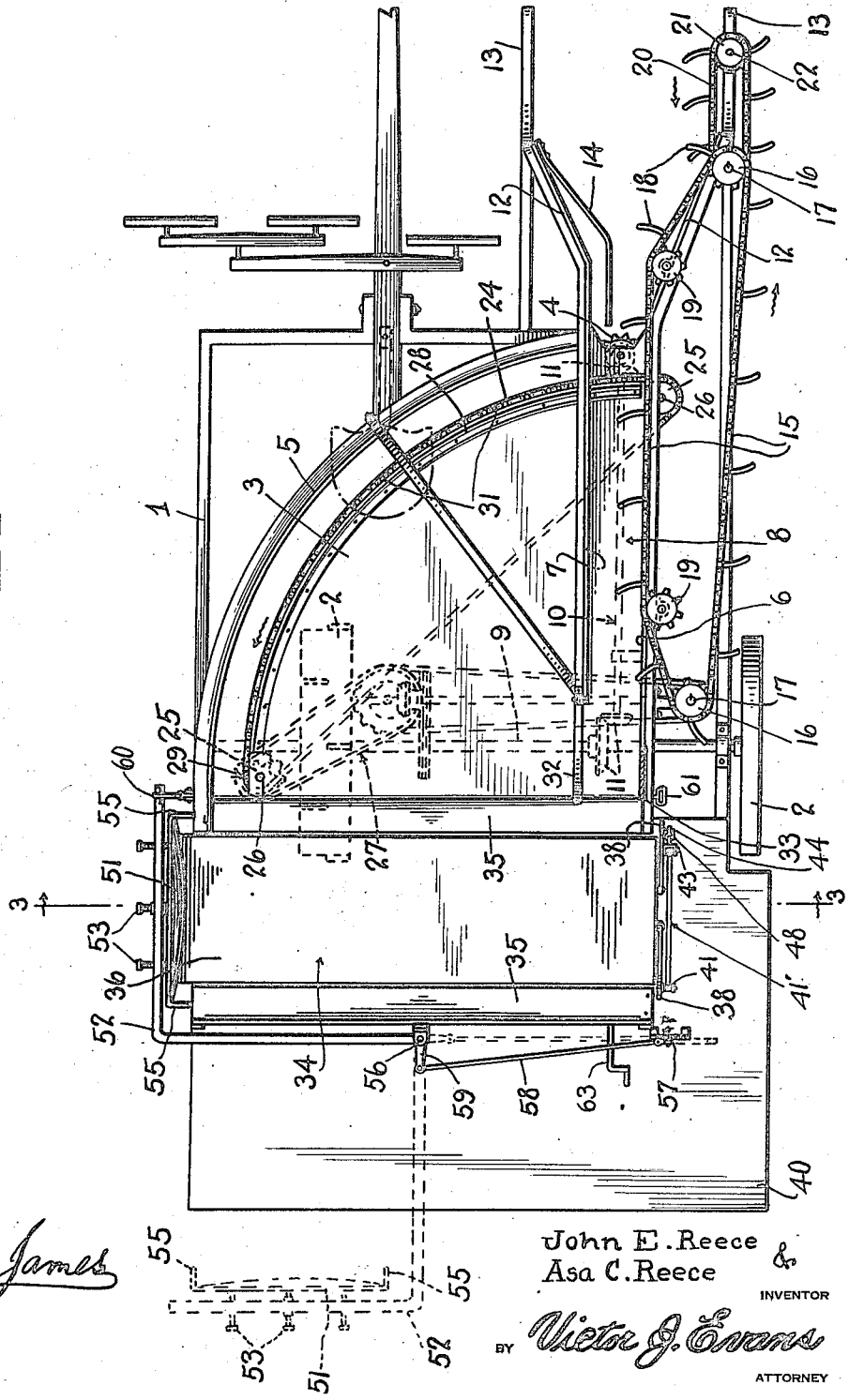

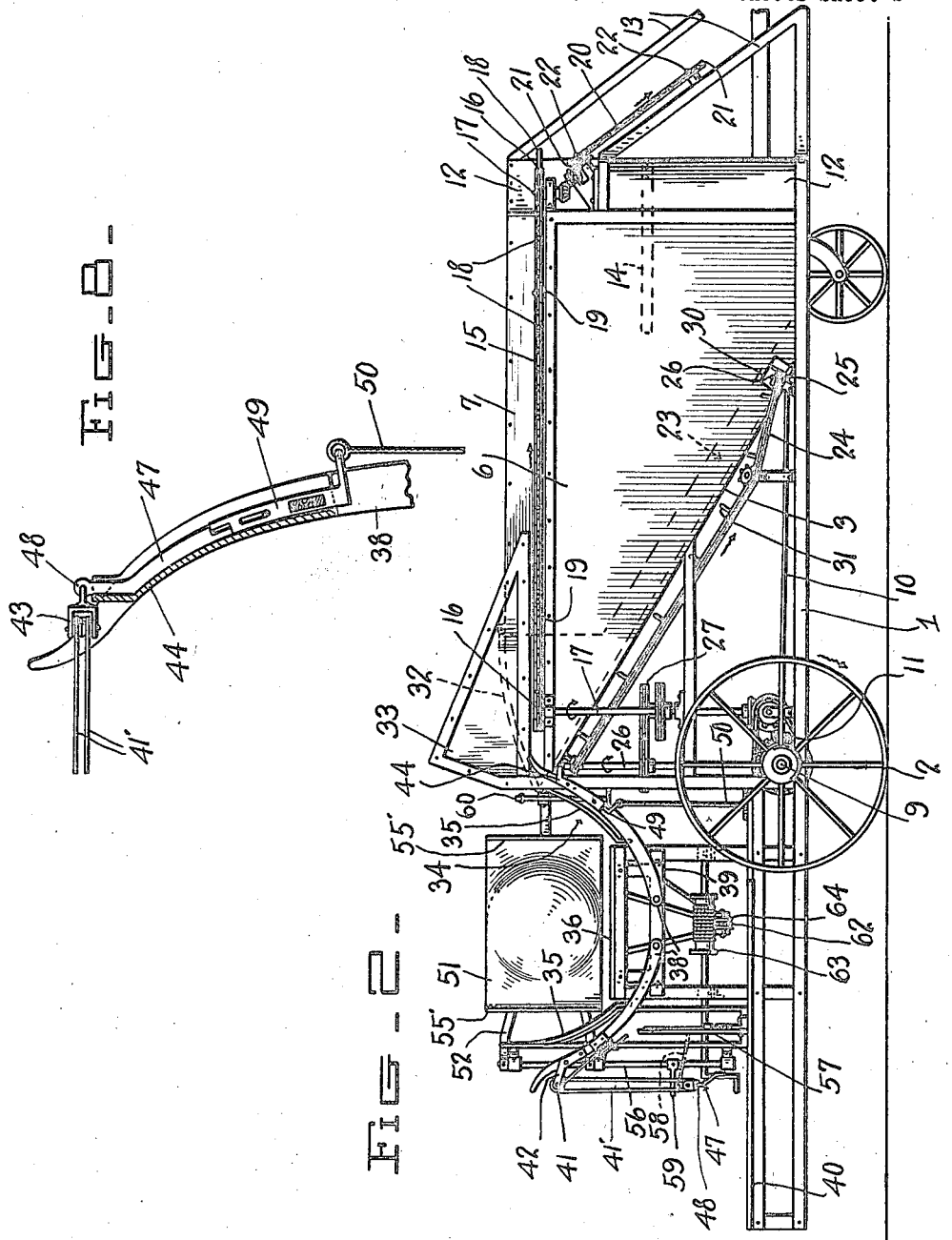

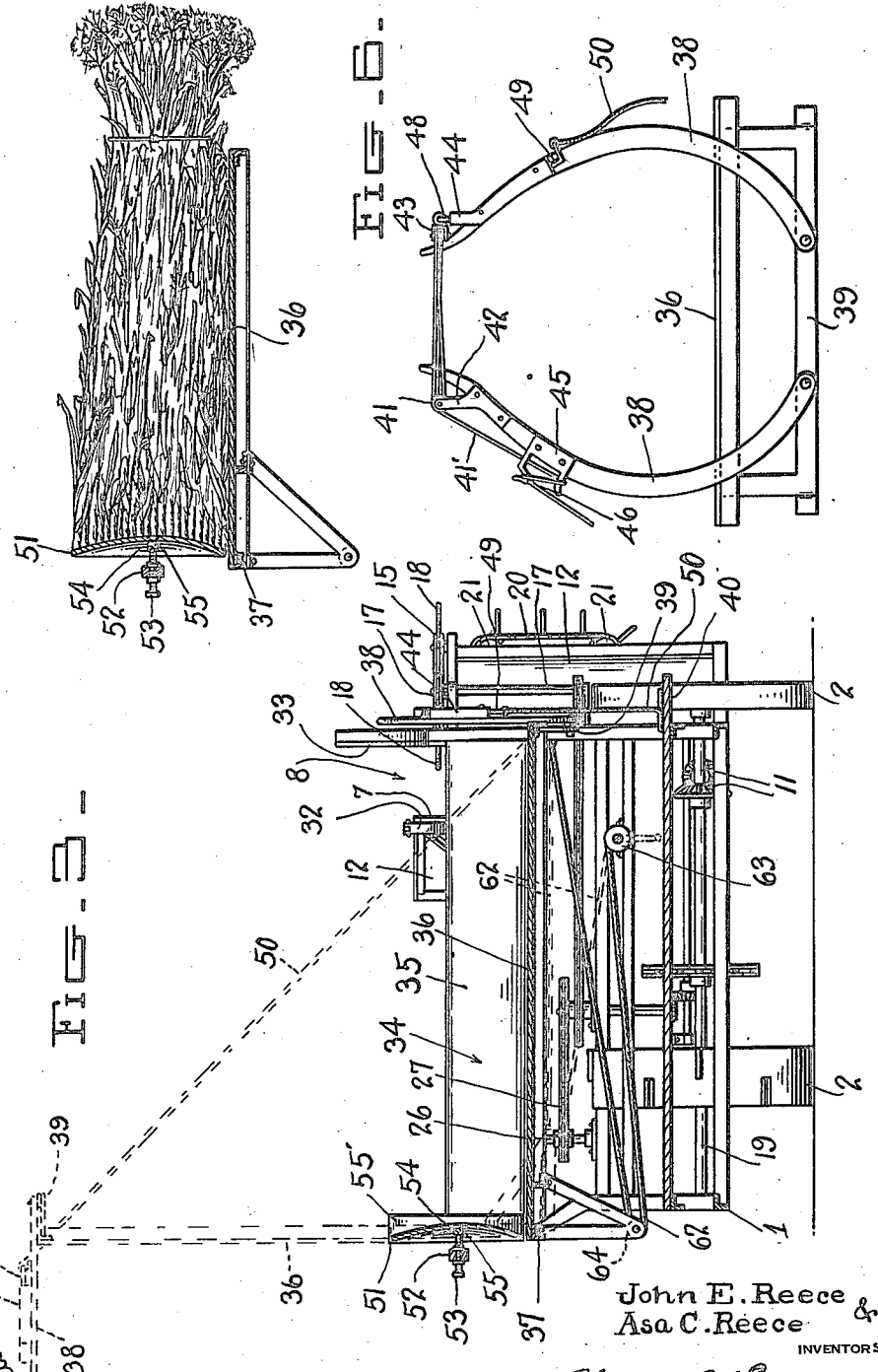

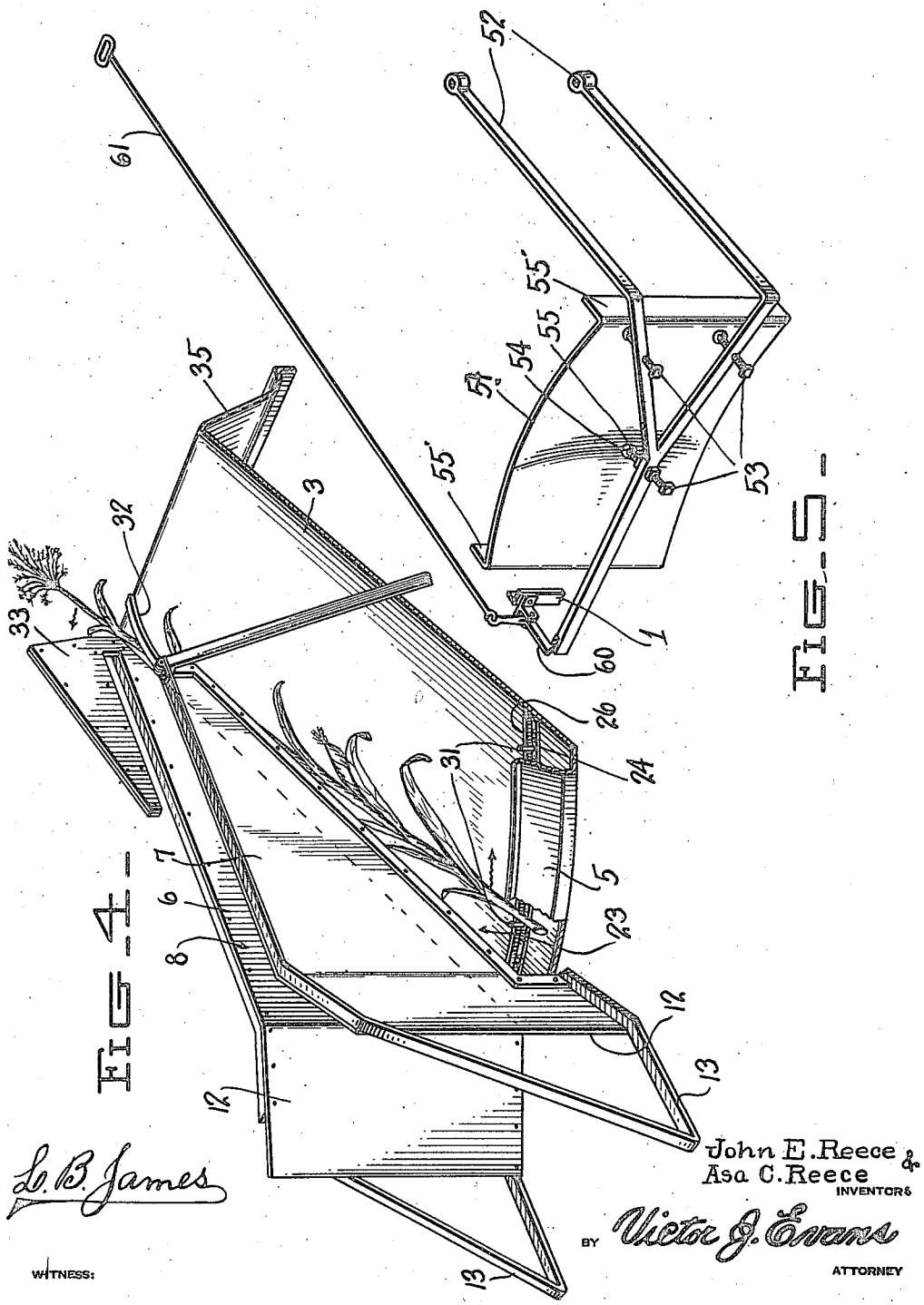

1,456,569

UNITED STATES PATENT OFFICE.

JOHN E. REECE AND ASA C. REECE, OF BUTLER, TENNESSEE.

CORN HARVESTER.

Application filed November 15, 1920. Serial No. 424,272.

*To all whom it may concern:*

Be it known that we, JOHN E. REECE and ASA C. REECE, citizens of the United States, residing at Butler, in the county of Johnson and State of Tennessee, have invented new and useful Improvements in Corn Harvesters, of which the following is a specification.

This invention relates to improvements in corn harvesters, the general object of the invention being to provide means for cutting the corn, conveying the corn to a shocker trough, compressing the stalks in the trough into a shock to permit tying of the shock and finally depositing the shock in an upright position on the ground.

Another object of the invention is to provide means for so forming the shock that the butts of the stalks will be so arranged as to insure the shock remaining in upright position on the ground after being deposited thereon.

A still further object of the invention is to provide means for facilitating the dumping of the shock and the releasing thereof from the dumping means.

A further object of the invention is to provide means for picking up stalks which have been blown down so that they can be cut by the knife.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a plan view of an apparatus constructed in accordance with our invention.

Figure 2 is an elevation thereof.

Figure 3 is a section on line 3—3 of Figure 1.

Figure 4 is a perspective view of the channel side of the apparatus.

Figure 5 is a view of the end gate of the shocker trough.

Figure 6 is an end view of the shocker platform showing the arms in raised position.

Figure 7 is a sectional view through the shocker means showing the shock in position.

Figure 8 is an enlarged detail view of a portion of one of the shocker arms.

In these views 1 indicates the frame of the device which is supported from the wheels 2. This frame supports the platform 3 which slopes downwardly towards the front of the machine from its high horizontal rear edge and the front part of the platform also slopes downwardly towards the righthand corner, where the knife 4 is located. The front edge of the platform curves from the cutting means to the left hand upper corner and this curved edge is provided with an upwardly extending flange 5. Upright walls 6 and 7 are located at the righthand side of the platform and these walls are spaced apart to form a channel 8, the inclined bottom of which is formed by a part of the platform 3. The knife 4 is situated at the front end of this inclined bottom. This knife is shown as a rotary one with saw teeth and is driven from the jack shaft 9 through the shaft 10 and gears 11. The front ends of the walls 6 and 7 flare away from each other, as shown at 12, so as to provide guiding means for guiding the stalks of corn to the knife and these parts may be provided with the guiding strips 13 at the front end for increasing the length of the guiding means. The extension 12 of the inner wall 7 is provided with a spring 14 which is formed with a horizontal part which directs the stalks to the knife. An endless chain 15 is arranged at the top of the outer wall, said chain being carried by the sprockets 16 located on the upper ends of the vertical shafts 17, suitably journaled in the frame and one of which is driven from the jack shaft 9 in any suitable manner. This chain carries the fingers 18 for engaging the stalks and an idler 19 causes the inner reach of the chain to travel parallel with the straight part of the channel and at an angle adjacent the flaring extension 12 of the outer wall 6. Thus the stalks of corn are picked up by the fingers at the wide mouth of the channel and are directed towards the knife and as the chain is driven faster than the machine is traveling the stalks will be bent by the fingers so that they will be easily cut by the knife and the cut stalks will be deposited into the channel by the fingers.

In order to pick up stalks that have been knocked down we provide a short endless chain 20 which is arranged above the inclined upper edge of the guiding strip 13 of the wall 6, this chain being carried by the sprockets 21 carried by shafts 22, one of which is geared to the front shaft 17 of the endless chain 15. The fingers of this endless chain 20 will pick up the stalks and direct them to a point where they will be seized by the fingers of the chain 15. The lower edge of wall 7 is cut away to leave a space 23 between said lower edge and the platform 3 for the passage of the stalks from the channel 8. The stalks are carried from the channel up the platform by means of the endless chain 24 which is carried by the sprockets 25 located on the shafts 26 suitably mounted in the frame and one of which is driven from the jack shaft by the transmission means shown generally at 27. A curved track 28 is placed on the platform a slight distance from its curved edge and this track is concentric with said curved edge. This track is engaged by the chain and holds the outer reach of the chain in an arc of a circle. After leaving the track the chain passes through an opening 29 in the platform and passes under the platform and up through an opening 30 adjacent the bottom of the channel. This chain carries the fingers 31 which project above the track and are adapted to engage the stalks in the channel and carry them along with the chain up the platform. As will be understood, the butts are engaged by this chain and the tops of the stalks will be held by a pivoted finger 32 which has one end pivoted to the end of the wall 7 and its other end engaging the upper edge of the platform. The tops of the stalks also engage an abutment 33 which is formed by an extension of the rear part of wall 6. It will thus be seen that the chain will swing the main portions of the stalks out of the channel and up the platform so that the stalks are turned at right angles when they reach the said upper edge of the platform. The finger 32 and the abutment 33 will prevent the longitudinal movement of the stalk as it is being swung around by the chain but as soon as the butt of the stalk reaches the upper edge of the platform the finger 32 is moved upwardly by the slowly moving upper part of the stalk, thus permitting the stalk to drop into the shocker trough 34 at the rear of the platform.

This shocker trough 34 is arranged transversely of the machine and it consists of two curved walls 35 which have their bottom edges spaced apart to receive the flat bottom piece or platform 36. This part 36 is hinged at one end to a part of the frame as at 37 and at its upper end are located the shocker arms 38 which are pivoted at the lower ends to the frame 39 which forms part of the platform or part 36. These arms are of curved shape, as shown, and when in inoperative position are located below the shocker trough so as to not interfere with the stalks of corn dropping into the trough from the platform 3. A platform 40 extends in rear of the trough and along the end thereof which carries the arms so that an operator may assist the feeding of the stalks into the trough from the platform 3 and actuate the different parts of the shocker.

The operator actuates the arms by blocks and tackle, one block 41 being permanently connected to a bracket 42 on one arm and the other block 43 being detachably connected to a bracket 44 on the other arm. A bracket 45 is carried by the arm 38 on which the block 41 is located and this bracket 45 carries a wedge part 46 for holding the cable 41' after the same has been tightened to hold the arms in position with the shock between them.

Bracket 44 is of channel iron construction and receives a bar 47 which is provided with an eye 48 to receive the hook on block 43. The bar is held in the channel bracket by means of the latch member 49 which is slidably mounted in said bracket and is adapted to engage the lower end of the bar 47 to hold the same in the bracket. This latching member 49 is adapted to be moved into inoperative position to free said bar 47 by means of cable 50 which has its free end located within reach of the operator standing on the platform 40.

When a sufficient number of stalks have been deposited in the shocker trough to form a shock the operator places the bar 47 in the bracket 44 and engages the same with the latch member so that said bar will be held in the bracket. He then pulls on cable 41' to swing the arms upwardly to squeeze the stalks together. He then passes the end of the cable around the bracket 45 and into the wedge member 46 so as to hold the arms in this position. He then passes a string around the shock, adjacent the arms, and ties it. The platform 36 is then tilted, by means hereinafter described, to throw the shock in upright position upon the ground. The operator then pulls upon cable 50 to move the latch 49 into inoperative position to release bar 47. The weight of the shock will throw the bar outwardly and the arms apart so that the platform can be returned to horizontal position and the shock will be left in upright position upon the ground.

In order to hold the butts of the stalks forming the shock in proper position to insure the shock standing upright upon the ground when thrown from the apparatus, we provide a gate 51 for the hinged end of platform 36. This gate is adjustably connected to a frame 52 by means of the bolts 53 passing through the frame and having the balls 54 at their ends engaging the sockets 55 in the gate. As shown in Figure 5 there are three of these bolts and these are so arranged that the position of the gate may be adjusted as desired. The ends of the gate are provided with flanges 55 and the gate is of substantially concavo-convex shape so that the bottom of the shock will have its center depressed as shown in Figure 7. This will insure the shook remaining in upright position when deposited upon the ground. The frame 52 is of L-shape and is hinged to a part of the frame as shown at 56. A hand lever 57 is connected by link 58 with a projection 59 on said frame adjacent the hinge thereof, these parts being so arranged that when the lever is operated the frame and the gate will be swung away from the platform 36 so as to not interfere with the tilting operation thereof. This hand lever may be provided with a pawl and ratchet for holding said lever with the gate in open and closed position or we may provide a latch 60 for engaging a part of the frame for holding the gate in operative position, said latch being controlled by the hand bar 61 which extends across the machine and has its handle located adjacent the platform 40.

The means for tilting the platform 36 comprises a cable 62 which has one end connected with the frame and its other end connected with a windlass 63, the cable passing over a guiding pulley 64. When the cable is wound upon the windlass it will be shortened and thus swing the platform upwardly to throw the shock thereon upon the ground.

From the above it will be clear that when the machine is moved across a field of corn, by horses or a tractor, the stalks of corn in a row will be guided to the knife by the spring 14 and the fingers of the endless chains. The stalks of corn after being severed by the knife will be deposited in the channel and the said stalks will be carried up the platform 3 by the fingers on chain 24. As the stalks are carried up the platform they will be turned, due to their butts being carried along by the chain and the tops being held by the finger 32 and the abutment 33, and when the top of the platform is reached the stalks will be extending transversely across the machine and will be deposited into the shocker trough. The stalks may be adjusted as they drop into the trough by the operator standing on platform 40, and when a sufficient number of stalks have been deposited into the shocker trough to make a shock, the machine is stopped the operator on platform 40 connects the two arms together by the block and tackles and by pulling upon the cable 41' squeezes the stalks by the arms so that he may tie the shock. He then swings the gate away from the platform 36 by means of the lever 57 and then rotates drum 63 to swing the platform upwardly. Finally he pulls upon cable 50 to release bar 47 and the block 43 so that the weight of the shock will cause the arms to open and thus permit the shock to drop upon the ground. The shape of the bottom of the shock, caused by the gate 51, will insure the shock remaining in upright position on the ground. The machine is then started up again to cut the stalks of corn to form a new shock.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A corn harvester comprising a frame, cutting means at the front end of said frame, shocker means at the rear end of the frame and means for carrying the stalks of corn from the cutting means to the shocker means and turning them at right angles as they travel along, said means including an inclined platform, a traveling member moving in a curved path on the platform for engaging the butts of the stalks and means at the top of the platform for engaging the tops of the stalks for preventing longitudinal movement of the stalks.

2. A corn harvester comprising a frame, cutting means at the front end of said frame, shocker means at the rear end of the frame and means for carrying the stalks of corn from the cutting means to the shocker means and turning them at right angles as they travel along, said means including a traveling member for engaging the butts of the stalks, an abutment against which the tops of the stalks bear and a pivoted finger also engaging the tops of the stalks.

3. A corn harvester comprising a frame, cutting means at the front end of the frame, a shocker trough transversely arranged at the rear of the machine, an inclined platform, a channel part for receiving the stalks from the cutting means, said channel part having a space formed between the bottom edge of its inner wall and the platform, conveying means on the platform for taking the stalks from the channel part to the shocker trough and turning said stalks at right angles as they travel along.

4. A corn harvester comprising a frame, cutting means at one end thereof, a shocker trough at the other end, a channel part formed with upright walls, the cutting means being located at the front end of said channel part, flaring extensions at the front ends of said walls forming a mouth for the channel part, a spring guiding member on one side of said mouth, movable fingers on the other side of the mouth for bringing the stalks against the cutting means, means for moving some of said fingers horizontally and some of the others on an incline and conveying means for conveying the stalks from the channel to the shocker.

5. A corn harvester comprising a frame, cutting means at one end thereof, a shocker trough at the rear of the frame, means for conveying the stalks from the cutting means to the trough, a gate at one end of the trough, a hinged frame, means adjustably connecting the gate to said frame, and means for depositing the shock upon the ground.

In testimony whereof we affix our signatures.

JOHN E. REECE.
ASA C. REECE.